US005773822A

United States Patent [19]

Kitamura et al.

[11] Patent Number: 5,773,822

[45] Date of Patent: Jun. 30, 1998

[54] ION DETECTOR AND HIGH-VOLTAGE POWER SUPPLY

[75] Inventors: Satoshi Kitamura; Tatsuji Sato, both of Tokyo, Japan

[73] Assignee: Jeol Ltd., Tokyo, Japan

[21] Appl. No.: 757,662

[22] Filed: Nov. 29, 1996

[30] Foreign Application Priority Data

Nov. 30, 1995 [JP] Japan .................................... 7-311960

[51] Int. Cl.[6] ............................ B01D 59/44; H01J 49/00

[52] U.S. Cl. ............................................ 250/281; 250/283

[58] Field of Search ..................................... 250/281, 283

[56] References Cited

U.S. PATENT DOCUMENTS

| | | | |
|---|---|---|---|
| Re. 33,344 | 9/1990 | Stafford | 250/281 |
| 3,898,456 | 8/1975 | Dietz | 250/281 |
| 4,810,882 | 3/1989 | Bateman | 250/281 |
| 4,896,035 | 1/1990 | Mahoney et al. | 250/309 |
| 4,988,867 | 1/1991 | Laprade | 250/281 |
| 5,481,108 | 1/1996 | Yano et al. | 250/281 |

FOREIGN PATENT DOCUMENTS 5-314946 11/1993 Japan .

*Primary Examiner*—Bruce Anderson
*Attorney, Agent, or Firm*—Webb Ziesenheim Bruening Logsdon Orkin & Hanson, P.C.

[57] ABSTRACT

An ion detector for use with a mass spectrometer or other instrument and a high-voltage power supply are provided. The detector comprises two dc power sources connected in series at a junction grounded. Each dc power source delivers an output voltage which can be switched between 0 V and a given voltage. The junction between the resistors, or voltage-dividing terminal, is connected with a conversion dynode. The polarity of an ion-accelerating voltage applied to the conversion dynode is switched, depending on whether detected ions are positive or negative. Ions are accelerated and caused to strike the conversion dynode, thus releasing secondary electrons. The secondary electrons are accelerated and detected by a scintillator.

4 Claims, 3 Drawing Sheets

ION DETECTOR AND HIGH-VOLTAGE POWER SUPPLY

FIELD OF THE INVENTION

The present invention relates to an ion detector where ions are accelerated and caused to collide with a conversion dynode so as to release secondary electrons, which are then accelerated and detected by a scintillator, thus detecting the ions. The invention also relates to a high-voltage power supply for use with such an ion detector.

BACKGROUND OF THE INVENTION

An ion detector for use in a mass spectrometer or other instrument and a power supply used with the ion detector are shown in FIG. 3. FIGS. 4A and 4B illustrate the relation of the polarities of ions to an accelerating voltage applied to a conversion dynode. The ion detector shown in FIG. 3 is used for mass detection as in mass spectrometry. If ions are introduced from the ion optics of a mass spectrometer via a collector slit, ions 21 traveling in the direction indicated by the arrow A (i.e., from the left) are accelerated by applying a voltage between the conversion dynode, indicated by 22, and a vacuum enclosure 26. The accelerated ions are caused to strike the conversion dynode 22, so that secondary electrons 23 are emitted from the surface of the dynode. The secondary electrodes 23 are accelerated by applying a voltage between the conversion dynode 22 and a scintillator 24. The secondary electrodes 23 strike the scintillator 24, thus emitting light. The light is detected by a photomultiplier 25.

The ions detected by the mass spectrometer are positive ions or negative ions, depending on the substance to be analyzed. Therefore, it is necessary to invert the polarity of the voltage impressed between the conversion dynode 22 and the vacuum enclosure 26, depending on the polarity of ions to be detected. In practice, when positive ions are to be detected, i.e., the instrument is in the positive mode, a voltage of −7 kV, for example, is applied to the conversion dynode 22 with respect to the vacuum enclosure 26, as shown in FIG. 4A. When negative ions are to be detected, i.e., the instrument is in the negative mode, a voltage of +7 kV, for example, is applied to the conversion dynode 22 with respect to the vacuum enclosure 26, as shown in FIG. 4B. This voltage of +7 kV is generated by a high-voltage dc power supply 27. The states of relays 28 and 29 are switched by a control circuit 31 so that the polarity of the voltage applied between the conversion dynode 22 and the vacuum enclosure 26 is inverted.

The ions 21 are converted into secondary electrons 23 by the conversion dynode 22, whether the detected ions are positive or negative, as described above. Therefore, the scintillator 24 must be maintained at a positive potential with respect to the conversion dynode 22, irrespective of the polarity of the detected ions. Actually, a voltage of +7 kV is always applied to the scintillator 24 with respect to the conversion dynode 22.

However, only the voltage applied between the conversion dynode 22 and the vacuum enclosure 26 is inverted in polarity, depending on whether the detected ions are positive or negative, as shown in FIG. 3. Consequently, the relays 28 and 29 must accommodate themselves to high-voltage switching. Furthermore, in order to accelerate the secondary electrons 23, a high-voltage dc power supply 30 is connected between the conversion dynode 22 and the scintillator 24. Since the conversion dynode 22 is at a high positive or negative potential with respect to the vacuum enclosure 26, it is necessary to float the dc power supply 30 connected between the conversion dynode 22 and the scintillator 24. In consequence, a transformer where the first and second windings are isolated with a large withstand voltage is necessary.

SUMMARY OF THE INVENTION

The present invention is intended to solve the foregoing problems. It is an object of the present invention to provide a high-voltage power supply which is not required to have a large withstand voltage and which does not need relays for high-voltage switching. It is another object of the invention to provide an ion detector using this power supply.

The present invention provides an ion detector comprising: a conversion dynode; an ion-accelerating means for accelerating ions toward said conversion dynode such that said ions strike said conversion dynode to release secondary electrons; a secondary electron-accelerating means for accelerating said secondary electrons toward an electron detector; said electron detector being equipped with an electron-light transducer for detecting said accelerated secondary electrons; a power supply consisting of two dc power sources connected in series at a junction grounded, each of said dc power sources delivering an output voltage capable of being switched between 0 V and a given nonzero voltage, said power supply having a positive-voltage output terminal connected with said electron-light transducer and a negative-voltage output terminal; a voltage-dividing means connected between said positive-voltage output terminal and said negative-voltage output terminal of said power supply, said voltage-dividing means having a tapping connected with said conversion dynode; and a control means for alternately operating said two dc power sources in such a way that when one dc power source delivers said given voltage, the other delivers 0 V and vice versa.

The present invention also provides a high-voltage power supply comprising: two dc power sources connected in series at a junction grounded, said two dc power sources having a positive-voltage output terminal and a negative-voltage output terminal, each of said dc power sources delivering an output voltage capable of being switched between 0 V and a given nonzero voltage; a voltage-dividing means connected between said positive-voltage output terminal and said negative-voltage output terminal and having a tapping; and a control means for alternately operating said two dc power sources in such a way that when one dc power source delivers said given voltage, the other delivers 0 V and vice versa. The high-voltage power supply produces an output voltage across said tapping of said voltage-dividing means and said positive-voltage or negative-voltage output terminal of said two dc power sources.

Other objects and features of the invention will appear in the course of the description thereof which follows.

DETAILED DESCRIPTION OF THE INVENTION

Figure 1:
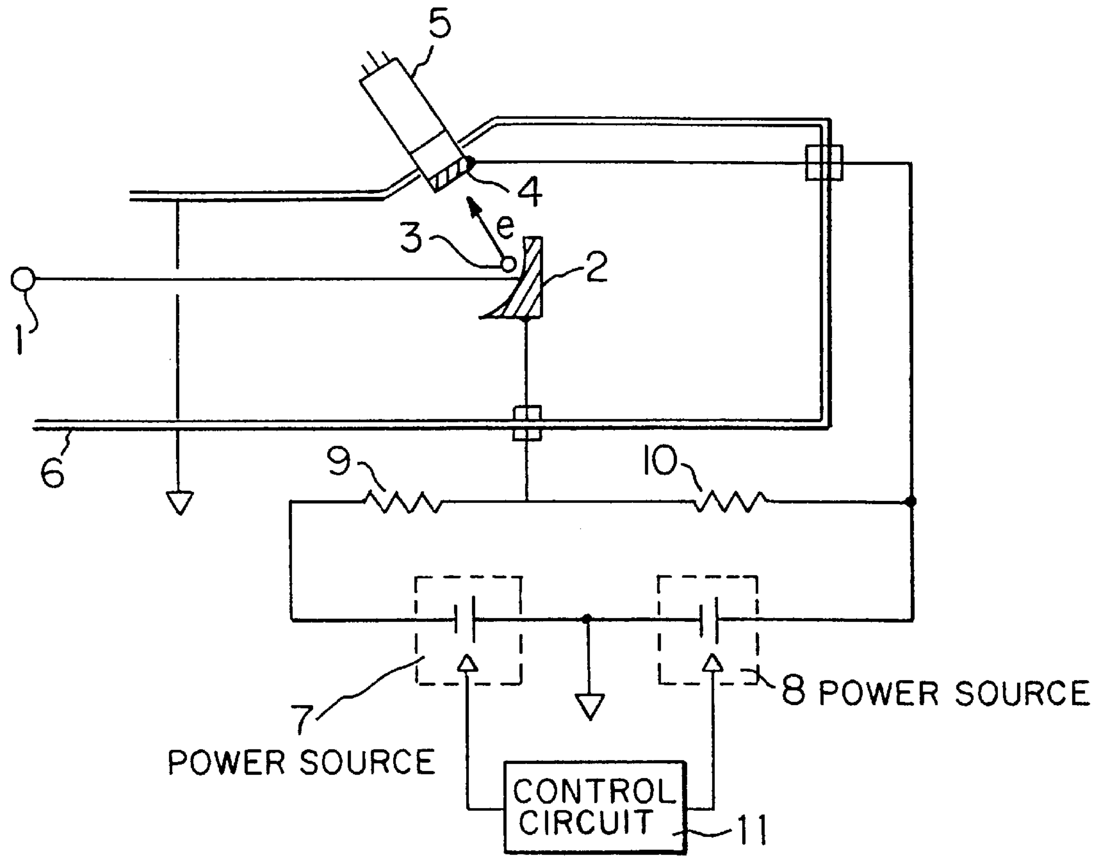
FIG. 1 is a circuit diagram of an ion detector according to the present invention.
Figure 4A:
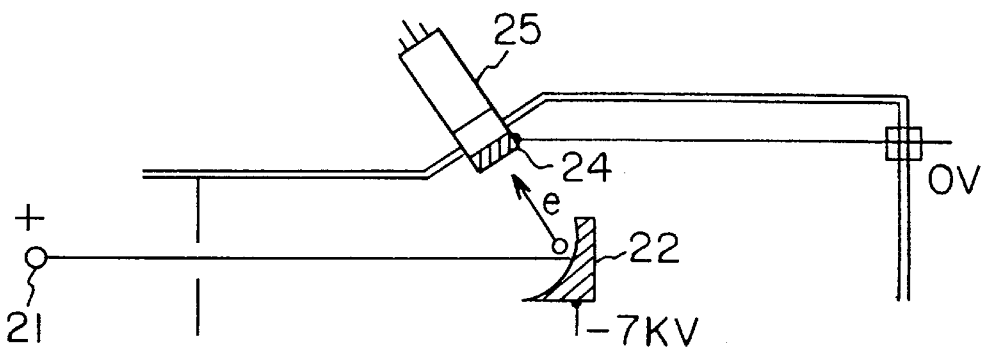
FIGS. 4A and 4B are diagrams illustrating the relation of the polarity of detected ions to the polarity of an accelerating voltage applied to a conversion dynode included in the detector shown in FIG. 3.

Referring to FIG. 1, there is shown an ion detector according to the present invention. This detector comprises a conversion dynode 2, a scintillator 4, a photomultiplier 5, a vacuum enclosure 6, high-voltage dc power sources 7, 8, voltage-dividing resistors 9, 10, and a control circuit 11. Ions 1 are made to strike the conversion dynode 2. As a result, secondary electrons 3 are released from the dynode.

The vacuum enclosure 6, the conversion dynode 2, the scintillator 4, and the photomultiplier 5 together form the detection portion of a mass spectrometer. The high-voltage dc power sources 7, 8, the voltage-dividing resistors 9, 10, and the control circuit 11 together form a power supply for the detection portion. In this power supply, the unipolar dc power sources 7 and 8 are connected in series at a junction which is grounded. The voltage-dividing resistors 9 and 10 have the same resistance value and are connected across the dc power sources 7 and 8 to obtain divided voltages. The positive-voltage terminal of the power supply is connected with the scintillator 4. The tapping between the voltage-dividing resistors 9 and 10 is connected with the conversion dynode 2. The control circuit 11 is connected to both dc power sources 7 and 8 to operate them alternately. That is, when one power source delivers an output voltage of 0 V, the other delivers a given nonzero voltage, for example, 14 kV, and vice versa, depending on whether positive or negative ions are detected.

The operation of this ion detector is described now. When positive ions are to be detected, i.e., the instrument is in the positive mode, the control circuit 11 controls the dc power sources 7 and 8 in such a way that they deliver voltages of 14 kV and 0 V, respectively. As a result, a voltage of −7 kV is applied to the conversion dynode 2. A voltage of 0 V is applied to the scintillator 4. When negative ions are to be detected, i.e., the instrument is in the negative mode, the control circuit 11 controls the power sources 7 and 8 so that they deliver voltages of 0 kV and 14 kV, respectively. The result is that a voltage of +7 kV is impressed on the conversion dynode 2, and a voltage of +14 kV is applied to the scintillator 4.

More specifically, the dc power sources 7 and 8 are connected in series. The sum of the voltage between the conversion dynode 2 and the vacuum enclosure 6 and the voltage between the conversion dynode 2 and the scintillator 4 can be switched between 14 kV and 0 V by the series combination of the power sources 7 and 8 under control of the control circuit 11. The two power sources 7 and 8 are operated alternately in such a way that when one power source delivers 14 kV, the other delivers 0 V, and vice versa. The junction, or tapping, between the two dc power sources 7 and 8 is grounded. The positive-voltage output terminal is connected with the scintillator 4. The voltage developed across the series combination of the two power sources 7 and 8 is halved by the voltage-dividing resistors 9 and 10 of the same resistance. The tapping is connected with the conversion dynode 2. In this way, the voltage between the conversion dynode 2 and the vacuum enclosure 6 and the voltage between the conversion dynode 2 and the scintillator 4 are switched in a conventional manner.

Figure 2:
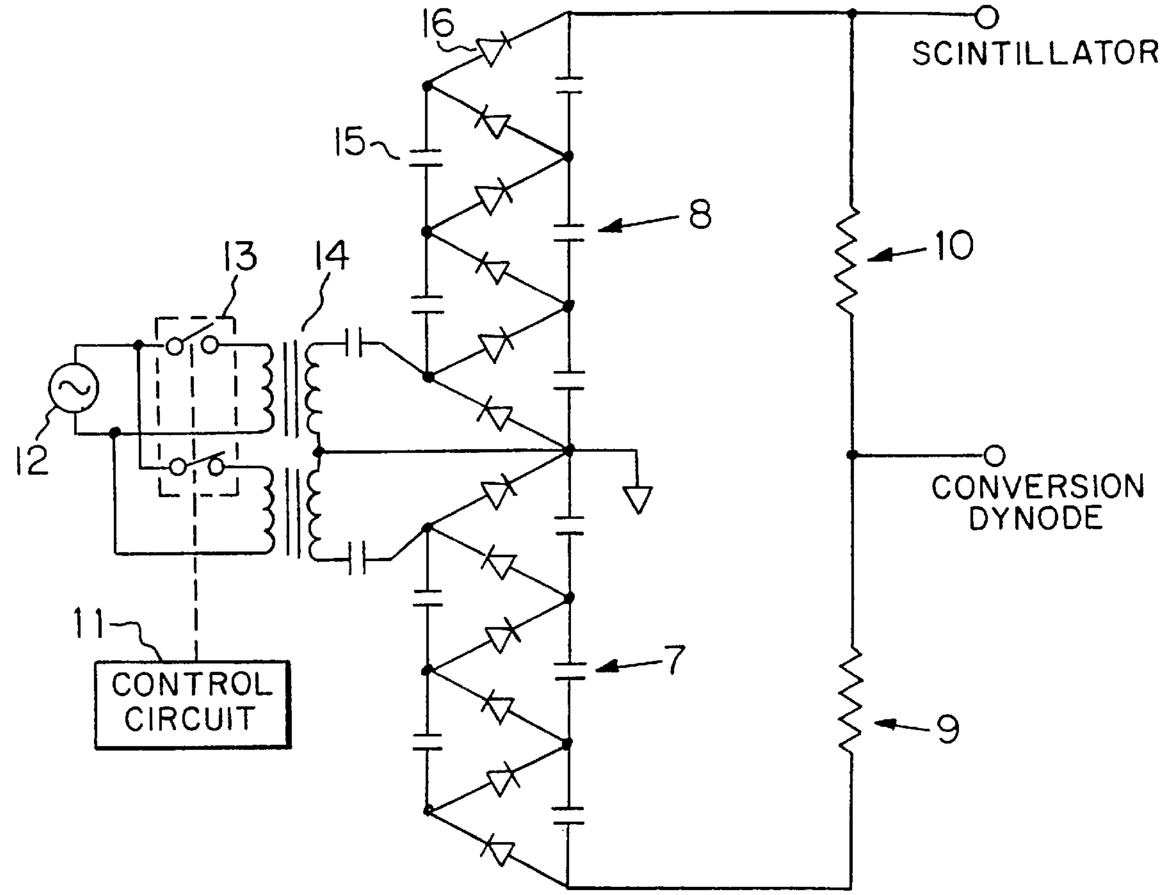
FIG. 2 is a circuit diagram of a high-voltage power supply for use in the ion detector shown in FIG. 1.
Figure 4B:
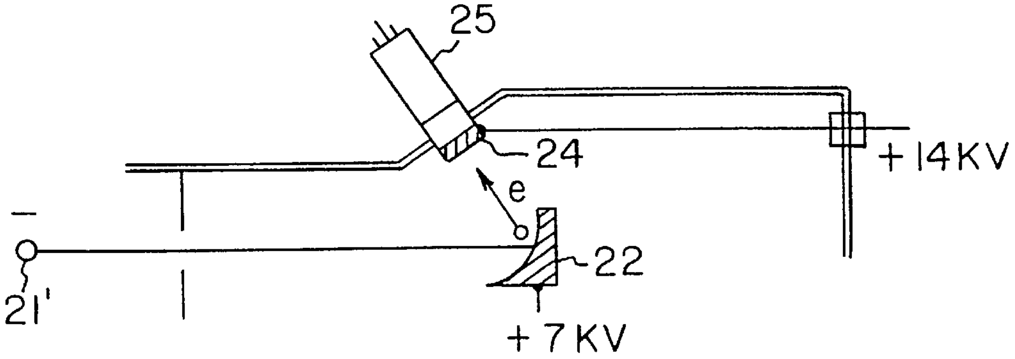
Figure 3:
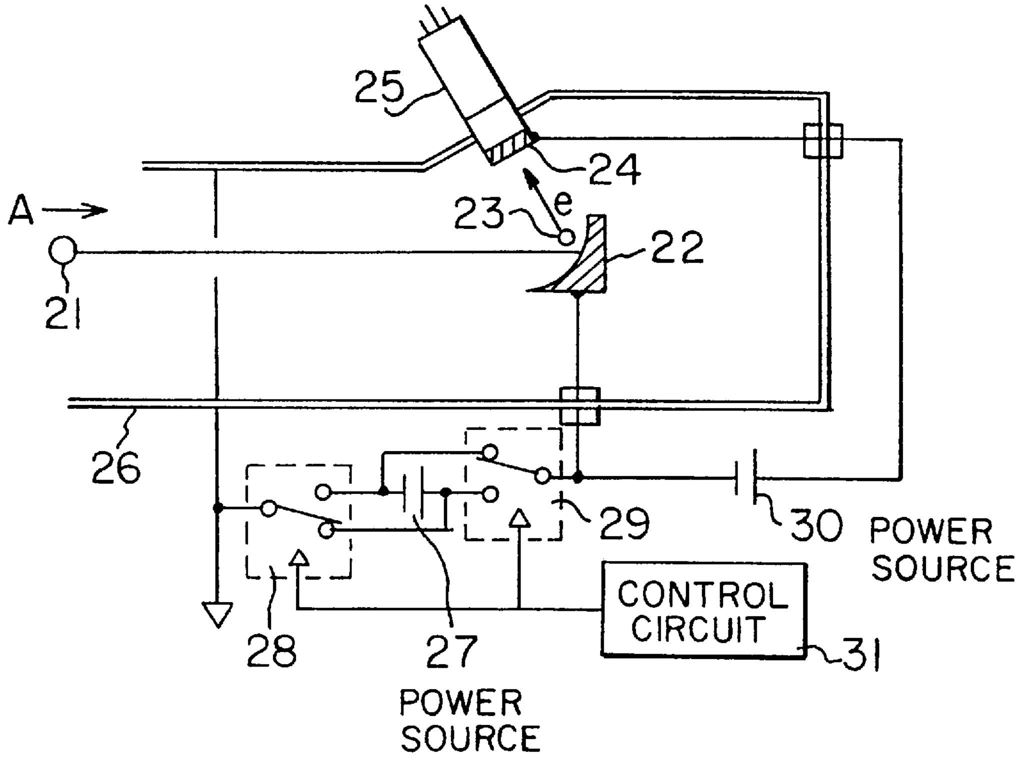
FIG. 3 is a circuit diagram of the prior art ion detector used in a mass spectrometer and its power supply.

Referring next to FIG. 2, the above-described high-voltage power supply including the dc power sources 7 and 8 and the control circuit 11 is particularly shown. This power supply used for ion detection further includes an alternating power source 12, relays 13, transformers 14, capacitors 15, and rectifying devices 16. The series combination of the dc power sources 7 and 8 comprises the two transformers 14 and Cockcroft step-up circuits having the capacitors 15 and rectifying devices 16 which are connected in series with the secondary windings of the transformers 14 at a junction which is grounded. The primary windings of the transformers 14 are alternately turned on and off by the control circuit 11. As an example, if the relays 13 are in the illustrated states, the alternating power source 12 is connected with the lower primary winding. The output from the lower secondary winding that is located under the junction between the two secondary windings is rectified. As a result, the dc power sources 7 and 8 deliver voltages of 14 kV and 0 V, respectively, that is, the detector functions to detect positive ions. Conversely, if the relays 13 are changed to their opposite states by the control circuit 11, the alternating power source 12 is connected with the upper primary winding. The output from the upper secondary winding is rectified. As a result, the power sources 7 and 8 deliver voltages of 0 V and 14 kV, respectively. That is, the instrument functions to detect negative ions.

It is to be understood that the present invention is not limited to the above embodiments and that various changes and modifications are possible. In the above embodiments, the invention is applied to a mass spectrometer. The invention may be applied to other analytical instruments where a voltage is required to be controlled, depending on whether positive or negative ions are detected. Furthermore, in the above embodiments, Cockcroft step-up circuits are used as high-voltage power sources. Other rectifier circuits and other high-voltage generating circuits may also be employed. Depending on the application, the output voltages from the two dc power sources connected in series may not be required to be identical. Moreover, the voltage division ratio may be adjustable.

As can be seen from the description made thus far in the present invention, a floating high-voltage source is not used on a separate high-voltage power supply, unlike the prior art instrument. Consequently, the withstand voltage between the primary and secondary sides of the transformer is not required to be made high. Further, since the primary winding is switched between states, relays for switching a high voltage are dispensed with.

Having thus described our invention with the detail and particularity required by the Patent Laws, what is desired protected by Letters Patent is set forth in the following claims.

What is claimed is:

1. An ion detector comprising:

a conversion dynode;

an ion-accelerating means for accelerating ions toward said conversion dynode such that said ions strike said conversion dynode to release secondary electrons;

a secondary electrons-accelerating means for accelerating said secondary electrons toward an electron detector;

said electron detector being equipped with an electron-light transducer for detecting said accelerated secondary electrons;

a power supply consisting of two dc power sources connected in series at a junction grounded, each of said dc power sources delivering an output voltage capable of being switched between 0 V and a given nonzero voltage, said power supply having a positive-voltage output terminal connected with said electron-light transducer and a negative-voltage output terminal;

a voltage-dividing means connected between said positive-voltage output terminal and said negative-voltage output terminal of said power supply, said voltage-dividing means having a tapping connected with said conversion dynode; and a control means for complementarily operating said two dc power sources in such a way that when one dc power source delivers said given voltage, the other delivers 0 V and vice versa.

2. The ion detector of claim 1, wherein said two dc power sources deliver substantially equal output voltages.

3. The ion detector of claim 1 or 2, wherein said voltage-dividing means has a voltage division ratio of 1.

4. The ion detector of claim 1 or 2, wherein said power supply comprises two transformers having their secondary windings connected in series, Cockcroft step-up circuits connected with said secondary windings, respectively, and delivering stepped-up outputs, and a switching means for connecting only one of primary windings of said two transformers with an alternating power supply at a time according to a control signal from said control means.

* * * * *

UNITED STATES PATENT AND TRADEMARK OFFICE

CERTIFICATE OF CORRECTION

PATENT NO. : 5,773,822

DATED : June 30, 1998

INVENTOR(S) : Satoshi Kitamura et al.

It is certified that error appears in the above-identified patent and that said Letters Patent is hereby corrected as shown below:

Title Page, refer to [73] Assignee, "Jeol Ltd." should read --JEOL Ltd.--.

Claim 1 Column 4 Line 49 "electrons-accelerating" should read --electron-accelerating--.

Signed and Sealed this

Twenty-fourth Day of November, 1998

*Attest:*

BRUCE LEHMAN

*Attesting Officer* *Commissioner of Patents and Trademarks*